United States Patent
Lee

(10) Patent No.: US 6,646,694 B2
(45) Date of Patent: Nov. 11, 2003

(54) METHOD OF REPAIRING LCD DATA LINES

(75) Inventor: Yen-Chih Lee, Taipei (TW)

(73) Assignee: AU Optronics Corp., Hsinchu (TW)

( * ) Notice: Subject to any disclaimer, the term of this patent is extended or adjusted under 35 U.S.C. 154(b) by 5 days.

(21) Appl. No.: 10/108,071

(22) Filed: Mar. 26, 2002

(65) Prior Publication Data
US 2002/0140896 A1 Oct. 3, 2002

(30) Foreign Application Priority Data
Mar. 27, 2001 (TW) ........................................ 90107143 A

(51) Int. Cl.$^7$ .................... G02F 1/333; G02F 1/334; G02F 1/13
(52) U.S. Cl. .................... 349/55; 349/54; 349/192
(58) Field of Search .................... 349/54, 55, 139, 349/192

(56) References Cited

U.S. PATENT DOCUMENTS 5,600,460 A * 2/1997 Yamamoto et al. ........... 349/54
6,476,882 B1 * 11/2002 Sakurai ...................... 349/55
2002/0140896 A1 * 10/2002 Lee ............................ 349/192

* cited by examiner

Primary Examiner—Robert H. Kim
Assistant Examiner—Dung Nguyen
(74) Attorney, Agent, or Firm—Ladas & Parry

(57) ABSTRACT

On a flat panel display, a substrate has a first pixel region and a second pixel region defined by a first data line and a second data line extended vertically, and a first gate line and a second gate line extended horizontally. A first pixel electrode and a second pixel electrode are formed in the first pixel region and the second region respectively. The first data line has an opening, and a first broken point and a second broken point are formed between the opening in the second pixel region. A method of repairing the first data line comprises steps of: electrically connecting the first data line and the first pixel electrode within the first pixel region; electrically connecting the first pixel electrode and the second pixel electrode; and electrically connecting the second pixel electrode and the second broken point of the first data line within the second pixel region.

20 Claims, 6 Drawing Sheets

METHOD OF REPAIRING LCD DATA LINES

BACKGROUND OF THE INVENTION

1. Field of the Invention

The present invention relates to a method of repairing broken lines and, more particularly, to a method of repairing LCD data lines.

2. Description of the Related Art

Liquid crystal display(LCD) devices are a well-known form of flat panel displays with advantages of low power consumption, lightweight, thin profile, and low driving voltage. The liquid crystal molecules change their orientations when an electronic field is applied. In the display region of the LCD, an array of pixel regions is patterned by horizontally extended gate lines and vertically extended data lines. Each pixel region has a thin film transistor (TFT) and a pixel electrode. The TFT serves as a switching device.

As described above, the TFT array substrate has wiring patterns such as the gate lines and data lines, that supply image signals to drive the pixel electrodes. However, the wiring patterns may easily disconnect if the regions they pass are not smooth or during the heat treatments or etching processes, resulting in open or short circuits. As size and resolution of LCD device continue to increase, large numbers of data lines and gate lines with a narrower line width are required on the TFT array substrate. The fabricating difficulties are also increased, causing a greater possibility of broken wiring patterns. Accordingly, it is desirable to provide a repair method that allows the LCD to operate despite broken wiring.

FIG. 1 is a top view showing a conventional method of repairing the disconnected data lines. On a TFT array substrate 10 of an LCD, a display region 20 has a plurality of horizontally extended gate lines 12 and a plurality of vertically extended data lines 16 to form an array of rectangular pixel regions 22. The TFT array substrate 10 also includes a plurality of gate pads 14 at an end of each gate line 12, and a plurality of data pads 18 at an end of each data line 16. In addition, a plurality of repair lines 24A, 24B and 24C are formed to cross the data lines 16 outside the display region 20.

For example, when a broken point A interrupts the image signals passing through the broken data line 16A, laser fusing or other conventional techniques can be used to connect points 26a and 26b where the broken data line 16A meet the repair line 24A, and the repair line 24A is cut off at positions 28a and 28b. Therefore, image signals can go through the repair line 24A to reach the broken point A. However, a capacitor is existed between the repair line 24A and the data line 16A, the image signals will be distorted at the intersecting point 26a or 26b when passing through the repair line 24A. Particularly, as the number of data lines 16 increases, the number of the intersecting points also increase, and thus the increased capacitors worsen the signal quality. Moreover, depending on the location of the broken data line, a large delay may be incurred due to the resistance and capacitance of the repair line between opposite ends of the broken data line. This increased delay may be unacceptable for large, high-resolution LCD devices. In addition, a single data line is generally repaired using a single repair line and the number of repair lines 24 is limited due to the size of the display region 20. Therefore, a method of repairing the broken data lines without fabricating repair lines to solve the aforementioned problems is called for.

SUMMARY OF THE INVENTION

The present invention provides a method of repairing broken data lines without fabricating extra wiring patterns outside the display region. The repairing method forms a repair line vertically across pixel regions.

On a flat display panel, a substrate has a first pixel region and a second pixel region formed by a first data line and a second data line extending vertically, and a first gate line and a second gate line extending horizontally. A first pixel electrode and a second pixel electrode are formed in the first pixel region and the second region respectively. An opening is formed between a first broken point and a second broken point of the first data line in the second pixel region. A method of repairing the first data line comprises steps of: electrically connecting the first data line and the first pixel electrode within the first pixel region; electrically connecting the first pixel electrode and the second pixel electrode; and electrically connecting the second pixel electrode and the second broken point of the first data line within the second pixel region.

Accordingly, it is a major object of the invention to use laser fusing to form an electrical connection across the first pixel electrode and the second pixel electrode.

It is another object of the invention to repair the line defect on the substrate without fabricating extra wiring patterns on the peripheral region of the pixel region.

Yet another object of the invention is to prevent signal distortion caused by the repair line positioned across the adjacent data lines.

It is a further object of the invention to provide the electric connection vertically across more than two pixel electrodes if more than one opening is found on the same broken data line.

Still another object of the invention is to prevent the increase in RC delay time caused by resistance and capacitance of the repair line.

Another object of the invention is to provide an unlimited number of repair lines irrespective of the space and size of the flat display panel.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
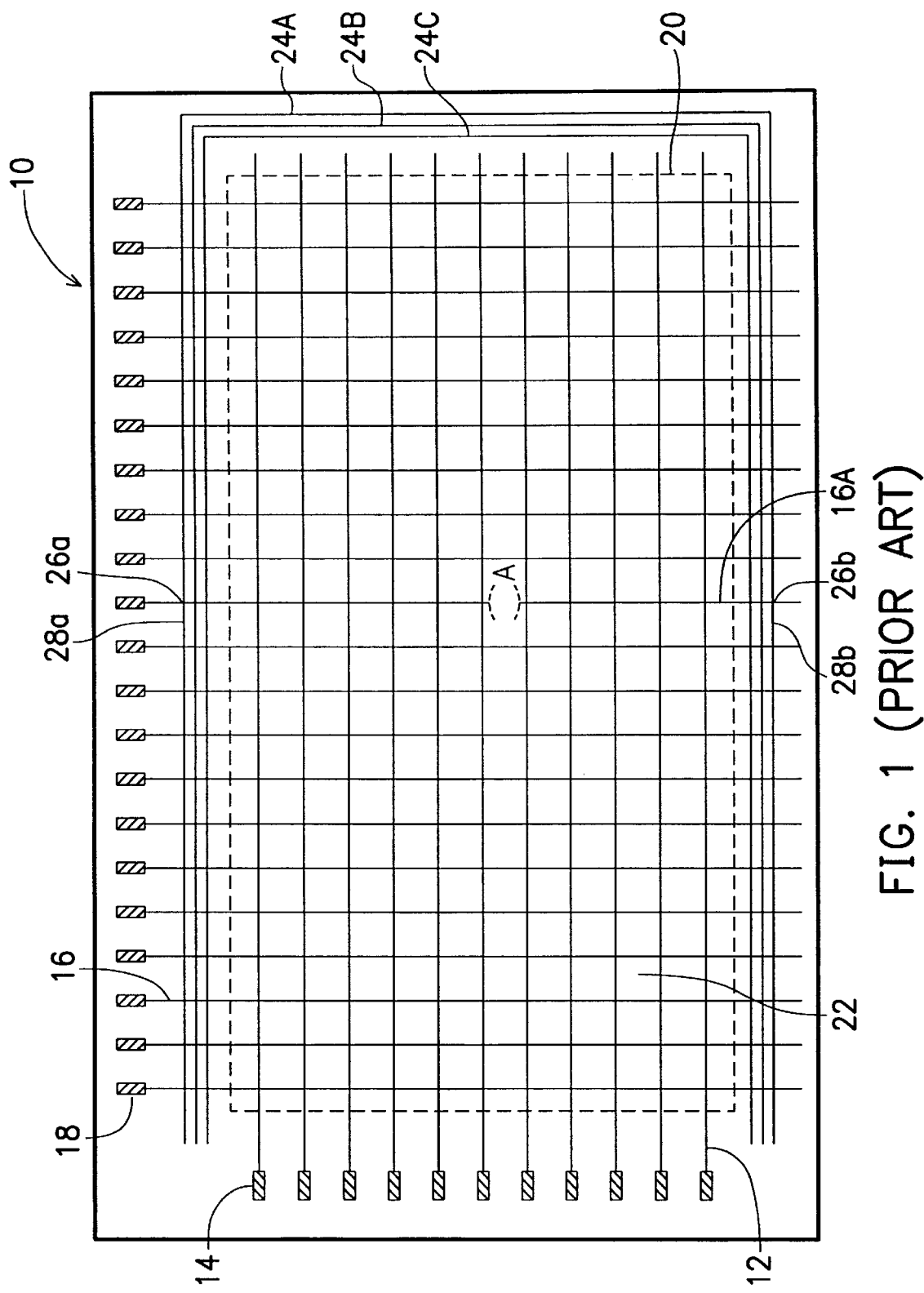
FIG. 1 is a top view showing a conventional method of repairing the disconnected data lines.
Figure 2:
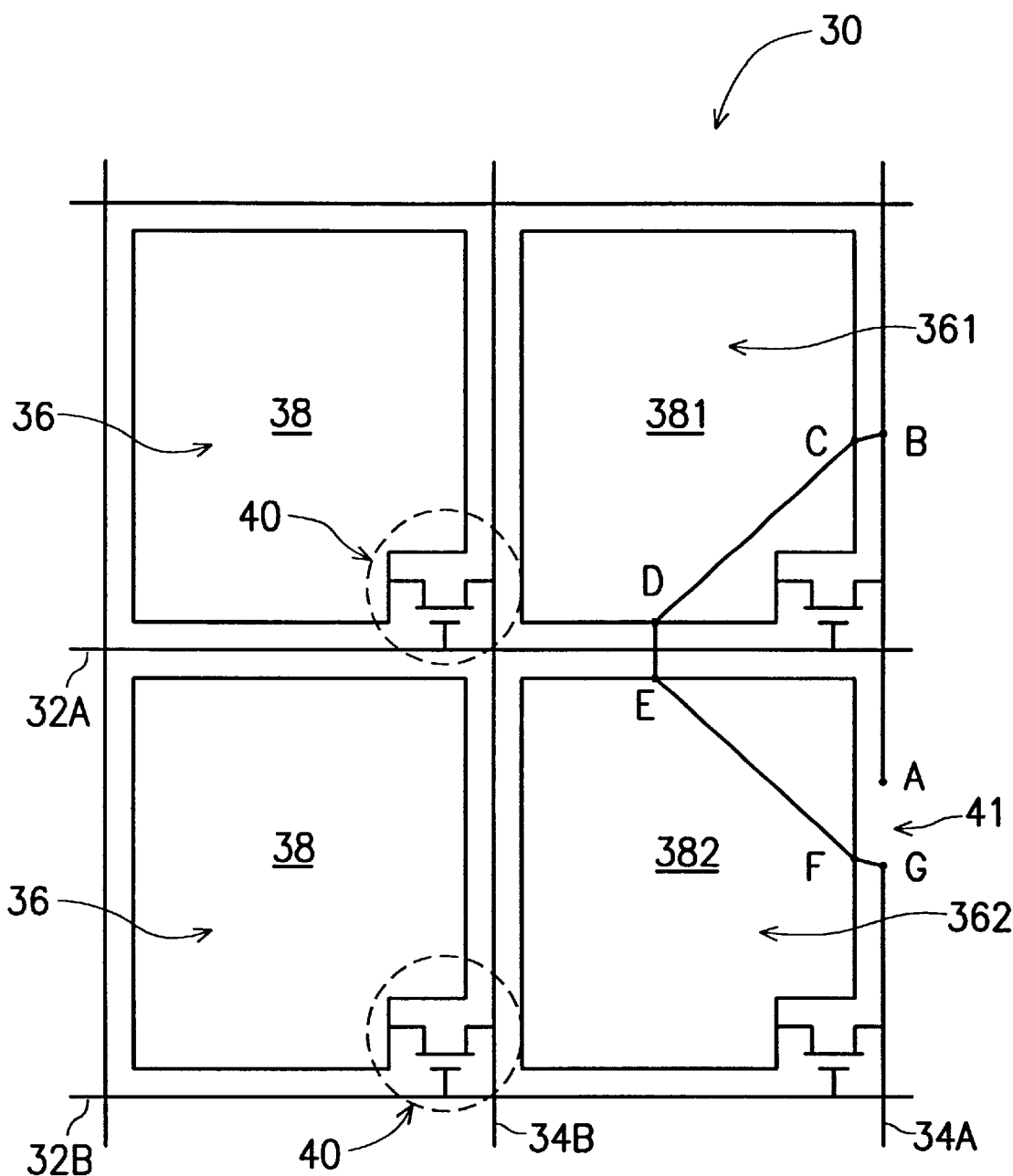
FIG. 2 is a top view showing a method of repairing a data line according to the present invention.

FIG. 2 is a top view showing a method of repairing a data line according to the present invention. On a TFT array substrate 30, a plurality of transverse-extending gate lines 32 and a plurality of lengthwise-extending data lines 34 define an array of rectangular pixel regions 36. Each pixel region 36 is covered by a pixel electrode 38 and has a TFT device 40.

For example, when an opening 41 is found between the two points A and G on the broken data line 34A, image signals transferred to the broken data line 34A cannot pass through the two points A and G. In the method of repairing the broken data line 34A, laser fusing technique is used on the points B, C, D, E and F respectively to form an electric connection between a first metal layer, a second metal layer and a conductive layer (shown in FIGS. 3 and 4). When the points B and C are electrically connected, the broken data line 34A is electrically connected to the first pixel electrode 381 in the first pixel region 361. When the points D and E are electrically connected, the first pixel electrode 381 of the first pixel region 361 is electrically connected to the second pixel electrode 382 of the second pixel region 362. When the points F and G are electrically connected, the second pixel electrode 382 of the second pixel region 362 is electrically connected to the broken data line 34A. Therefore, the electrically connecting path through the points B□C□D□E□F□G serves a repair line that goes around the opening 41 to repair the line defect between the points A and G on the broken data line 34A.

Compared with the conventional repair method, the method of the present invention uses laser fusing to form an electrical connection vertically across the first pixel electrode 381 and the second pixel electrode 382, thus the line defect is directly repaired on the substrate 30 without fabricating extra wiring patterns on the peripheral region of the pixel region 36. Also, since the repair line does not transversely cross the adjacent data lines 34, signal distortion is prevented. Moreover, if more than one opening is found on the same broken data line 34A, the repair method can form the electric connection vertically across more than two pixel electrodes 38. Thus, the number of the repair line is not limited by the space and size of the LCD, and the resistance and capacitance of the repair line will not be increased to cause a RC delay time.

Figure 3:
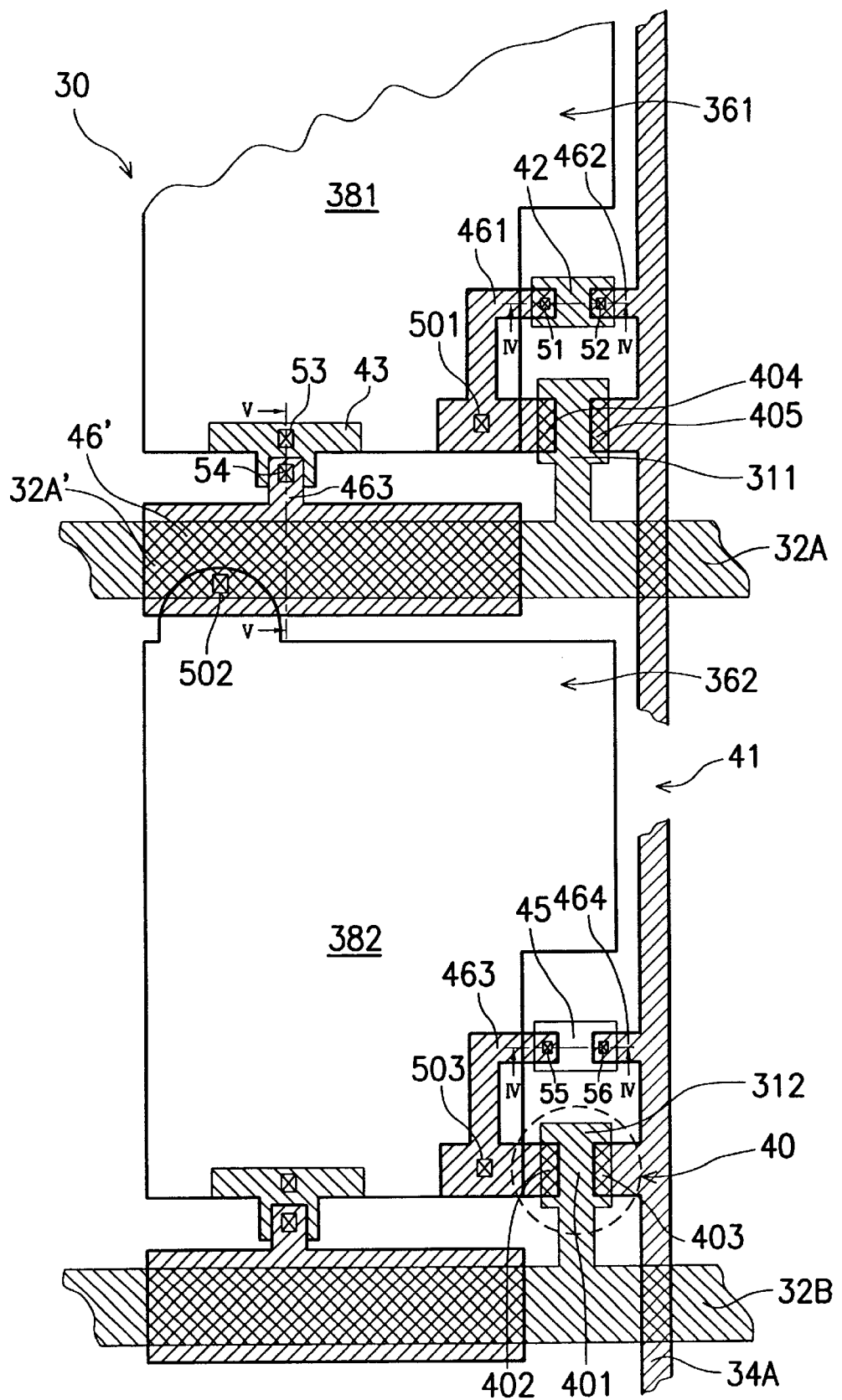
FIG. 3 is a top view showing a repair structure according to the present invention.
Figure 4A:
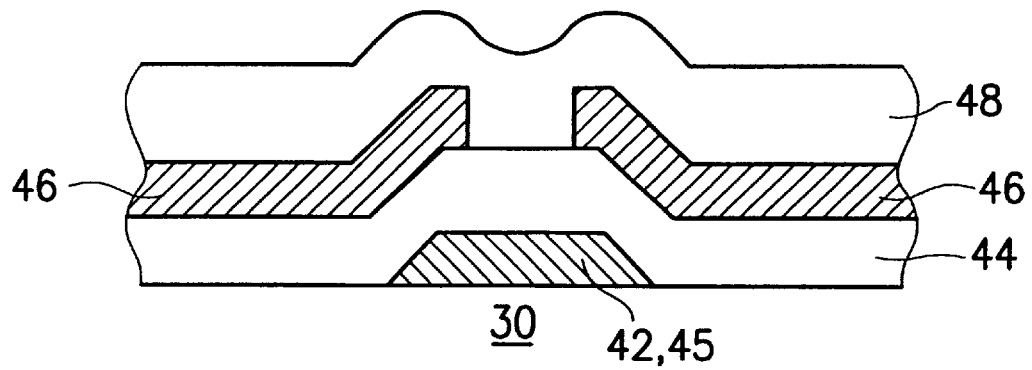
FIGS. 4A to 4B are sectional views along line IV—IV in FIG. 3 showing the repair process.
Figure 4B:
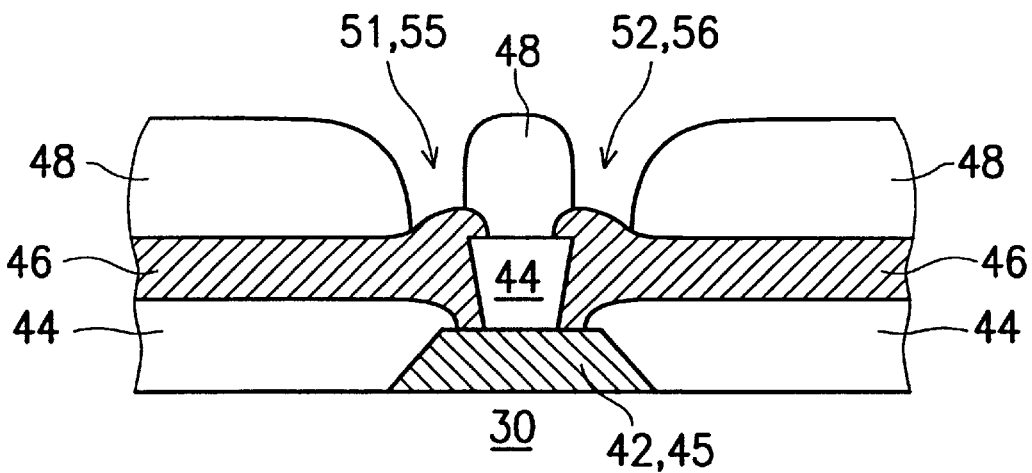
Figure 5A:
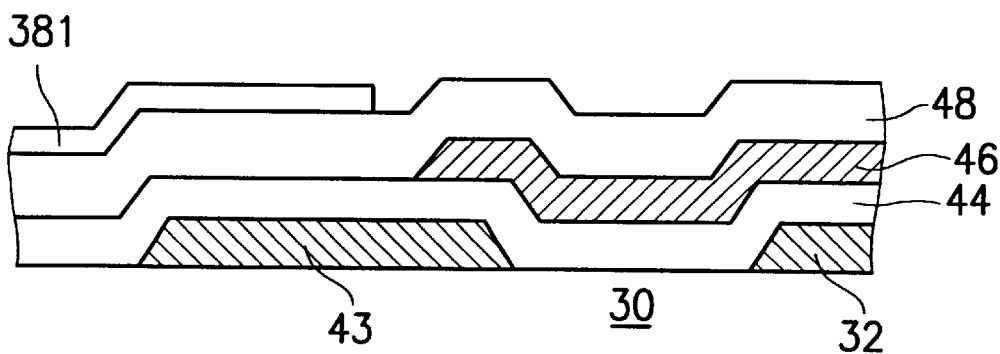
FIGS. 5A to 5B are sectional views along line V—V in FIG. 3 showing the repair process.
Figure 5B:
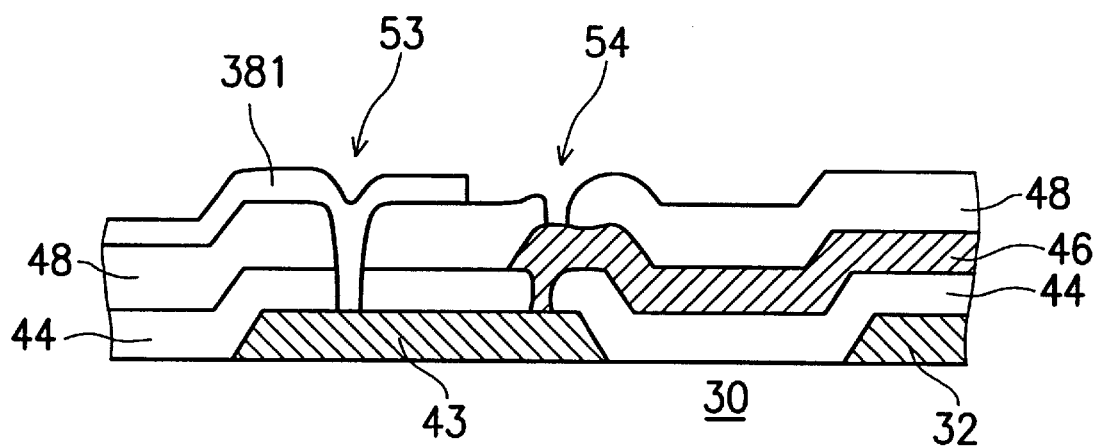

FIG. 3 is a top view showing a repair structure according to the present invention. FIGS. 4A to 4B are sectional views along line IV—IV in FIG. 3 showing the repair process. FIGS. 5A to 5B are sectional views along line V—V in FIG. 3 showing the repair process. In fabricating the substrate 30, a first metal layer is deposited and patterned to form the gate line 32, a gate electrode 401 of the TFT device 40, a bottom capacitor electrode, and the first electrical connecting layer 42. Depending on the requirements of electrical performance and repairing locations, the first electrical connecting layer 42 can be formed between the data line 34 and the pixel electrode 38, or between the pixel electrode 38 and the gate line 32.

Then, an insulating layer 44, at least a semiconductor layer and a second metal layer 46 are formed on the substrate 30. Next, the second metal layer 46 is patterned to form a drain electrode 402, a source electrode 403, the data lines 34 and an upper capacitor electrode 46'. Thereafter, a protection layer 48 and a conductive layer are formed on the substrate 30, and then the conductive layer is patterned to form the pixel electrode 38. The first metal layer and the second metal layer 46 are made of metallic materials, and the conductive layer is indium tin oxide (ITO).

For example, in the first pixel region 361 and the second pixel region 362, the first metal layer forms a first gate line 32A, a second gate line 32B, a first gate electrode 311, a second gate electrode 312, and a bottom capacitor electrode 32A' on a predetermined area of the first gate line 32A. Preferably, a first electrical connecting layer 42 and a third electrical connecting layer 45 are formed near a first gate electrode 311 and a second gate electrode 312 respectively, and a second electrical connecting layer 43 is formed near the bottom capacitor electrode 32A'. The insulating layer 44 covers the first metal layer. The second metal layer 46 is patterned to form a first data line 34A, a second data line 34B, a first drain/source electrode, a second drain/source electrode, and an upper capacitor electrode 46'. In the first pixel region 361, the first data line 34A has a first protruding portion 462, the first drain electrode, and a first extending portion 461 of the first drain electrode, all of these parts are positioned above the first electrical connecting layer 42. In the second pixel region 362, the first data line 34A has the second drain electrode, a second drain extending portion 463 of the second drain electrode above the third electrical connecting layer 45, and a second protruding portion 464 of the first data line above the third electrical connecting layer 45. The upper capacitor electrode 46' is positioned above the bottom capacitor electrode 32A' and extends to cover the second electrical connecting layer 43. The protection layer 48 is deposited on the second metal layer 46. The conductive layer is positioned on the protection layer 48 and pattern to form the first pixel electrode 381 and the second pixel electrode 382. In addition, the first pixel electrode 381 is electrically connected to the first drain electrode via a first contact hole 501, and the second pixel electrode 381 is electrically connected to the upper capacitor electrode 46' via a second contact hole 502.

In order to ensure the property of the substrate 30, the line defect can be determined by observing the brightness of each pixel region 36. Hereinafter, the method of the present invention is provided to repair the data line 34A having an opening in the second pixel region 362, for example. First, as shown in FIGS. 4A and 4B, laser fusing is used on a first repair point 51 and a second repair point 52 to remove part of the insulating layer 44, thus the second metal layer 46 is electrically connected to the first electrical connecting layer 42. Also, since the second metal layer 46 is connected to the first pixel electrode 381 via the first contact hole 501, this the electrical connection between the data line 34A and the first pixel electrode 381 is completed. At this time, the electrical connection between point B and point D is completed.

Second, as shown in FIGS. 5A and 5B, laser fusing is used on the third repair point 53 and the fourth repair point 54 to remove part of the protection layer 48 and the insulating layer 44. Then, the first pixel electrode 381 is electrically connected to the second electrical connecting layer 43, and the second metal layer 46 is electrically connected to the upper capacitor electrode 46', resulting in a connection between the first pixel electrode 381 and the upper capacitor electrode 46'. Also, since the upper capacitor electrode 46' is electrically connected to the second pixel electrode 382 via the second contact hole 502, the connection between the first pixel electrode 381 and the second pixel electrode 382 is completed. At this time, the connection from the point D to the point E is also completed.

Third, as shown in FIGS. 4A and 4B, laser fusing is used on a fifth repair point 55 and a sixth repair point 56 to remove part of the insulating layer 44, thus the second metal layer 46 is electrically connected to the third electrical connecting layer 45. Also, since the second metal layer 46 is connected to the second pixel electrode 382 via the third contact hole 503, the electrical connection between the data line 34A and the second pixel electrode 382 is finished. At this time, the connection from the point E to the point G shown in FIG. 2 is also completed.

According to the above-described method, the present invention uses laser fusing to form electrical connections between the electrical connecting layers 42, 43 and 45, the second metal layer 46, and the pixel electrodes 381 and 382. Therefore, the repair line goes around the opening 41 to become an electrical loop.

Figure 6:
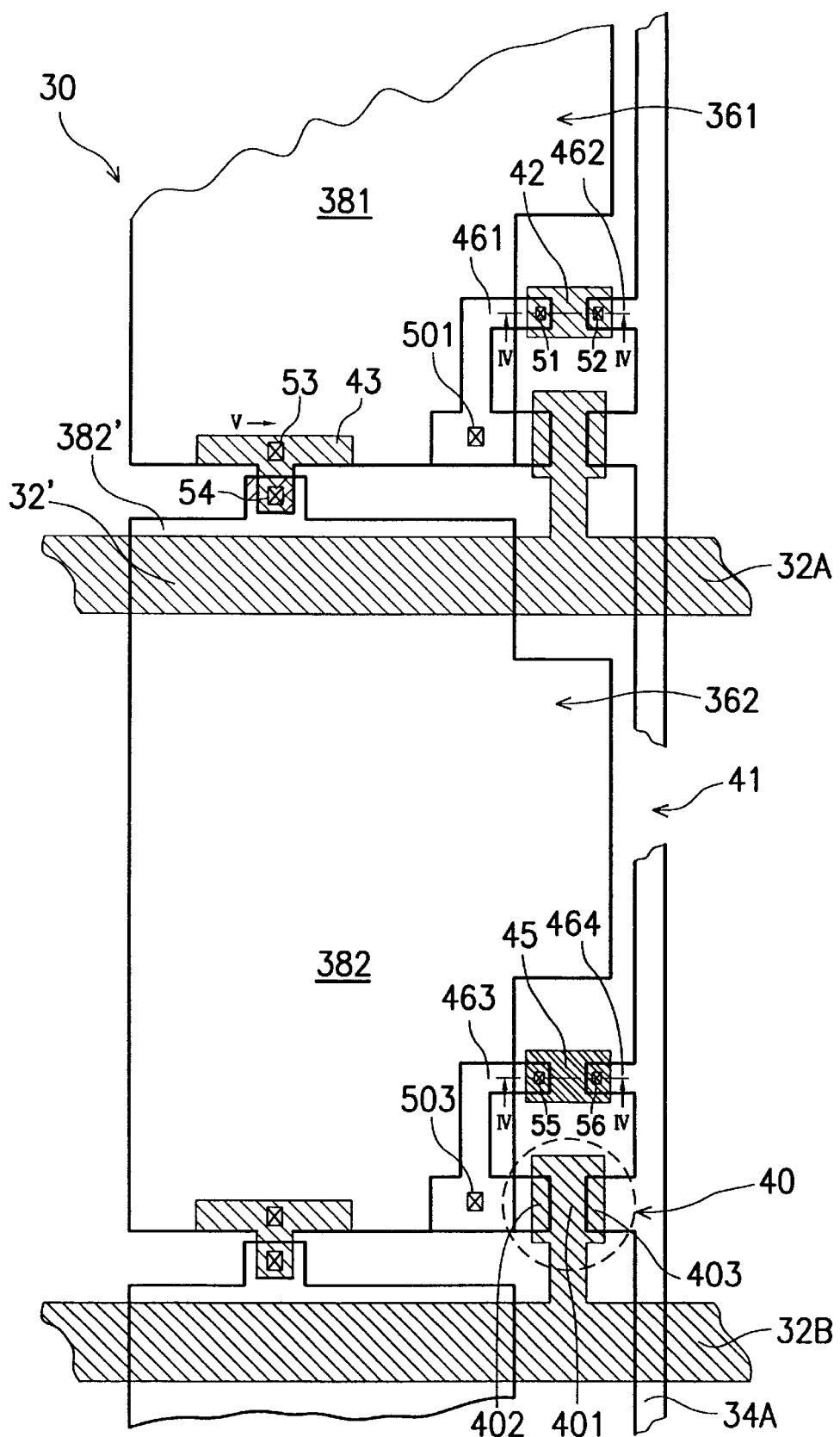
FIG. 6 is a top view showing another repair structure according to the present invention.

In another preferred embodiment, the location of the electrical connecting layers and the repair points is modified according to the various patterns of the first metal layer 32, the second metal layer 46 and the conductive layer. FIG. 6 is a top view showing another repair structure according to the present invention. A part of the second pixel electrode 382 covers the bottom capacitor electrode 32' to serve as the upper capacitor electrode 382', and the second metal layer 46 does not cover the bottom capacitor electrode 32'. Also, the part of the second pixel electrode 382 further extends to cover part of the second electrical connecting layer 43. In connecting the point D and the point E shown in FIG. 2, laser fusing is used on the third repair point 53 and the fourth repair point 54 to make an electrical connection between the first pixel electrode 381 and the upper capacitor electrode 382'.

It is to be understood that the present invention is not limited to the embodiments described above, but encompasses any and all embodiments within the scope of the following claims.

What is claimed is:

1. A method of repairing a flat panel display, comprising steps of:
    (a) providing a substrate having a first vertically-extended data line, a second vertically-extended data line, a first horizontally-extended gate line, and a second horizontally-extended gate line for defining a first pixel region and a second pixel region thereby, a first pixel electrode and a second pixel electrode positioned in the first pixel region and a second region respectively, the first data line having an opening, and a first broken point and a second broken point of the first data line being formed between the opening in the second pixel region;
    (b) electrically connecting the first data line and the first pixel electrode within the first pixel region;
    (c) electrically connecting the first pixel electrode and the second pixel electrode; and
    (d) electrically connecting the second pixel electrode and the second broken point of the first data line within the second pixel region.

2. The method according to claim 1, wherein the first pixel region is adjacent to the second pixel region.

3. The method according to claim 1, wherein the substrate further comprises a third pixel region between the first pixel region and the second pixel region.

4. The method according to claim 1, wherein the substrate further comprises conductive materials formed at different levels, the electrical connection between the first data line and the first pixel electrode is formed by connecting the conductive materials at different levels.

5. The method according to claim 1, wherein the first pixel region and the second pixel region comprise:
    a first metal layer for forming a first gate electrode, a second gate electrode, the first gate line, the second gate line, and a bottom capacitor electrode, the bottom capacitor electrode being formed at a predetermined area of the first gate line;
    a first electrical connecting layer near the first gate electrode;
    a second electrical connecting layer near the bottom capacitor electrode;
    a third electrical connecting layer near the second gate electrode;
    an insulating layer covering the first metal layer;
    a second metal layer formed above the insulating layer and patterned to form the first data line, the second data line, a first drain/source electrode, a second drain/source electrode, and an upper capacitor electrode,
    the first data line and the first drain electrode respectively having a first protruding portion and a first drain extending portion above the first electrical connecting layer, the first data line and the second drain electrode respectively having a second protruding portion and a second drain extending portion above the third electrical connecting layer, and the upper capacitor electrode being formed above the bottom capacitor electrode and extending to cover the second electrical connecting layer;
    a protection layer formed on the second metal layer and comprising a first contact hole and a second contact hole; and
    a conductive layer formed on the protection layer and patterned as the first pixel electrode and the second electrode,
    the first pixel electrode is connected to the first drain electrode via the first contact hole, and the second pixel electrode is connected to the upper capacitor electrode via the second contact hole.

6. The method according to claim 5, wherein the step (b) comprises steps of:
    providing a first repair point on the first protruding portion of the first data line in the first pixel region;
    using laser fusing technique to remove a part of the insulating layer on the first repair point to electrically connect the first data line and the first electrical connecting layer;
    providing a second repair point on the first drain extending portion in the first pixel region; and
    using laser fusing technique to remove a part of the insulating layer on the second repair point to electrically connect first drain electrode and the first electrical connecting layer.

7. The method according to claim 6, wherein the step (c) comprises steps of:
    providing a third repair point on the second electrical connecting layer;
    using laser fusing technique to remove a part of the insulating layer on the third repair point to electrically connect the first pixel electrode and the second electrical connecting layer;
    providing a fourth repair point on the upper capacitor electrode; and
    using laser fusing technique to remove a part of the insulating layer on the fourth repair point to electrically connect the second electrical connecting layer and the upper capacitor electrode.

8. The method according to claim 7, wherein the step (d) comprises steps of:
    providing a fifth repair point on the second drain extending portion in the second pixel region;
    using laser fusing technique to remove a part of the insulating layer on the fifth repair point to electrically connect the third electrical connecting layer and the second drain electrode;
    providing a sixth repair point on the second protruding portion of the first data line in the second pixel region; and using laser fusing technique to remove a part of the insulating layer on the sixth repair point to electrically connecting the first data line and the third electrical connecting layer.

9. The method according to claim 5, wherein the first electrical connecting layer and the third electrical connecting layer are formed by the first metal layer.

10. The method according to claim 5, wherein the first electrical connecting layer, the third electrical connecting layer and the conductive layer are made of the same material.

11. The method according to claim 5, wherein the second electrical connecting layer is formed of one material in the group consisting of the first metal layer, the second metal layer and the conductive layer.

12. The method according to claim 1, wherein the first pixel region and the second pixel region comprise:

a first metal layer for forming a first gate electrode, a second gate electrode, the first gate line, the second gate line, and a bottom capacitor electrode, the bottom capacitor electrode being formed at a predetermined area of the first gate line;

a first electrical connecting layer near the first gate electrode;

a second electrical connecting layer near the bottom capacitor electrode;

a third electrical connecting layer near the second gate electrode;

an insulating layer covering the first metal layer;

a second metal layer formed above the insulating layer and patterned to form the first data line, the second data line, a first drain/source electrode, and a second drain/source electrode, the first data line and the first drain electrode respectively having a first protruding portion and a first drain extending portion above the first electrical connecting layer, the first data line and the second drain electrode respectively having a second protruding portion and a second drain extending portion above the third electrical connecting layer;

a protection layer formed above the second metal layer and comprising a first contact hole; and a conductive layer positioned on the protection layer and patterned to form the first pixel electrode, the second electrode and an upper capacitor electrode;

the upper capacitor electrode is connected to the second pixel electrode and extended to cover the bottom capacitor electrode and the second electrical connecting layer, the first pixel electrode is connected to the first drain electrode via the first contact hole.

13. The method according to claim 12, wherein the step (b) comprises steps of:

electrically connecting the first protruding portion of the first data line and the first electrical connecting layer in the first pixel region; and electrically connecting the first electrical connecting layer and the first drain extending portion of the first drain electrode.

14. The method according to claim 13, wherein the step (d) comprises steps of:

electrically connecting the third electrical connecting layer and the second drain extending portion of the second drain electrode; and electrically connecting the second protruding portion of the first data line and the third electrical connecting layer.

15. The method according to claim 14, wherein the step (c) comprises steps of:

electrically connecting the first pixel electrode and the second electrical connecting layer;

electrically connecting the second electrical connecting layer and the upper capacitor electrode so as to connect the first and second pixel electrodes.

16. The method according to claim 14, wherein the first pixel electrode further comprises a pixel protruding portion overlapping the upper capacitor electrode, and the step (c) uses laser fusing technique to electrically connect the first pixel electrode and the upper capacitor electrode.

17. The method according to claim 12, wherein the first electrical connecting layer, the third electrical connecting layer and the first metal layer are made of the same material.

18. The method according to claim 12, wherein the first electrical connecting layer, the third electrical connecting layer and the conductive layer are made of the same material.

19. The method according to claim 12, wherein the second electrical connecting layer is formed of one material in the group consisting of the first metal layer and the second metal layer.

20. The method according to claim 12, wherein the first drain electrode and the second drain electrode are formed by one material in the group consisting of the second metal layer and the conductive layer.

* * * * *